United States Patent [19]
Kobayashi et al.

[11] Patent Number: 5,384,596
[45] Date of Patent: Jan. 24, 1995

[54] CCD IMAGING SYSTEM WITH TWO EXTENDED HORIZONTAL REGISTERS

[75] Inventors: Atsushi Kobayashi; Makoto Onga; Masatoshi Sase; Yasushi Sato, all of Kanagawa, Japan

[73] Assignee: Sony Corporation, Tokyo, Japan

[21] Appl. No.: 238,966

[22] Filed: May 5, 1994

Related U.S. Application Data

[63] Continuation of Ser. No. 39,522, Mar. 29, 1993, abandoned, which is a continuation of Ser. No. 742,004, Aug. 8, 1991, abandoned.

[30] Foreign Application Priority Data

Aug. 9, 1990 [JP] Japan .................................. 2-213484
Aug. 9, 1990 [JP] Japan .................................. 2-213485

[51] Int. Cl.⁶ ............................................ H04N 5/335
[52] U.S. Cl. .................................... 348/241; 348/311
[58] Field of Search ............... 348/241, 249, 250, 311, 348/302; H04N 5/335; 257/228, 229, 232

[56] References Cited

U.S. PATENT DOCUMENTS

| | | | |
|---|---|---|---|
| 4,660,090 | 4/1987 | Hynecek | 358/213.31 |
| 4,675,887 | 6/1987 | Akiyama et al. | 377/58 |
| 4,750,042 | 6/1988 | Murayama et al. | 358/213.31 |
| 5,025,318 | 6/1991 | Nagura | 358/213.15 |
| 5,038,215 | 8/1991 | Hadfield | 358/213.11 |
| 5,040,071 | 8/1991 | Stevens | 358/213.26 |

FOREIGN PATENT DOCUMENTS

| | | |
|---|---|---|
| 2611987 | 9/1988 | France . |
| 62-92587 | 4/1987 | Japan . |
| 63-1169 | 1/1988 | Japan . |
| 2-78382 | 9/1988 | Japan . |
| 1-225291 | 9/1989 | Japan . |
| 1-305672 | 12/1989 | Japan . |
| 2156628 | 10/1985 | United Kingdom . |

*Primary Examiner*—Joseph Mancuso
*Assistant Examiner*—Tuan V Ho
*Attorney, Agent, or Firm*—Hill, Steadman & Simpson

[57] ABSTRACT

In order to prevent a horizontal stripe and a flicker from taking place due to a gain difference between two circuit systems (channels), the solid state imager of the present invention includes a pilot signal generating means provided within a solid state image pickup element for allowing two output units to generate pilot signals of the same level and a gain correcting circuit provided outside of said solid state image pickup element for comparing levels of the pilot signals passed through the two circuit systems and correcting a gain of one circuit system if the two pilot signals have a level difference therebetween. Further, in a solid state imager of the present invention, a pilot signal for detecting gains of two circuit systems which process signals from two output units of a solid state image pickup element is inserted into a video signal without modifying the rule with respect to the signal timing so that signal charges are supplied from a pilot signal generating means to respective horizontal registers so as to output the pilot signal during the dummy bit output period.

4 Claims, 3 Drawing Sheets

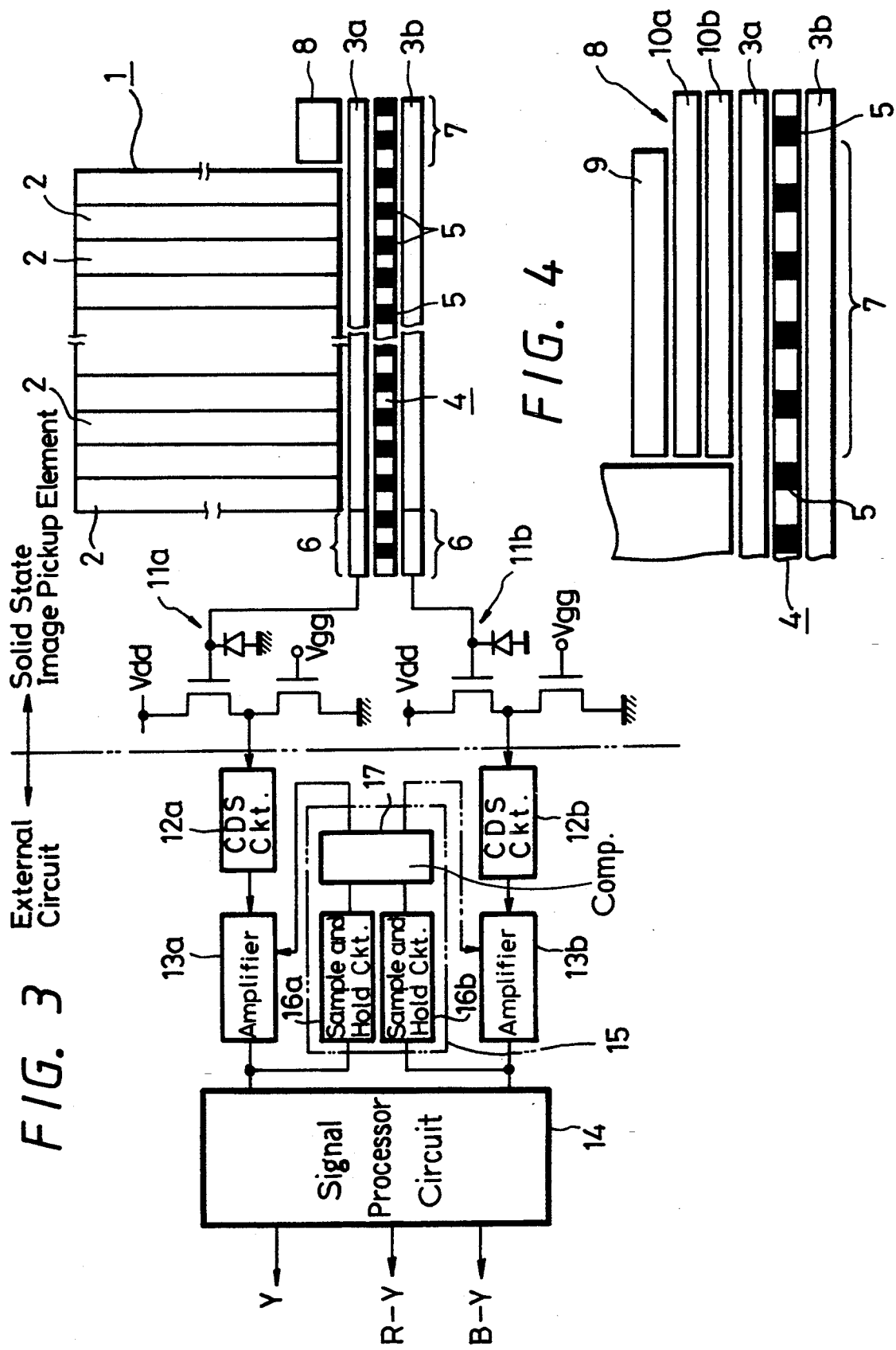

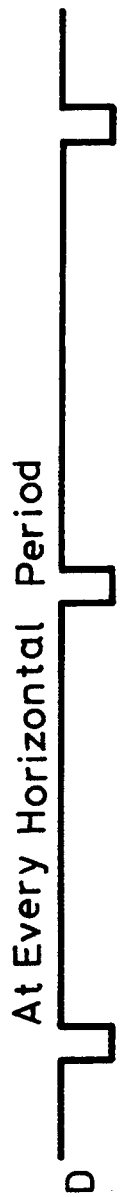
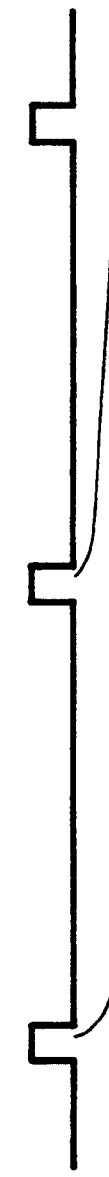
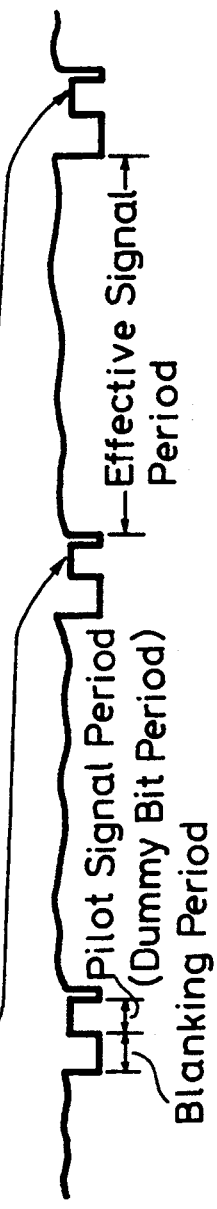
FIG. 5A Horizontal Sync. Signal HD
FIG. 5B Insertion of Pilot Signal
FIG. 5C Output Signal
FIG. 6A Vertical Sync. Signal VD
FIG. 6B Horizontal Sync. Signal HD
FIG. 6C Insertion of Pilot Signal
FIG. 6D Output Signal

CCD IMAGING SYSTEM WITH TWO EXTENDED HORIZONTAL REGISTERS

This is a continuation of application Ser. No. 08/039,522 filed Mar. 29, 1993, now abandoned, which is a continuation of application Ser. No. 07/742,004, filed Aug. 8, 1992 now abandoned.

BACKGROUND OF THE INVENTION

1. Field of the Invention

The present invention generally relates to solid state image pickup devices and, more particularly, is directed to a solid state image pickup device including a solid state image pickup element having a pair of output portions which simultaneously derive signals and an external circuit having a pair of circuit systems for processing the signals from the pair of output portions.

2. Description of the Prior Art

Conventional solid state imagers, such as a charge-coupled device (CCD) or the like are generally designed so as to read a signal in the field read-out system. However, in order to increase resolution more, the solid state imager must be designed so as to read whole picture elements (i.e., pixels). If the whole pixels are read, then signals of two horizontal lines must be read during 1H period (H is the horizontal period).

In order to read two horizontal line signals during 1H period, it is proposed to double the frequency of a conventional horizontal transfer clock which drives a horizontal register. This proposal cannot be substantially effected at least in the present condition.

To solve the above problem, another proposal is made, in which a plurality of horizontal registers are provided and signal charges of odd lines and signal charges of even lines are simultaneously horizontally transferred by separate horizontal registers.

FIG. 1 schematically shows a solid state image pickup element of the above-described previously proposed solid state imager.

Referring to FIG. 1, it will be seen that an image unit a is composed of a number of light receiving elements arranged in a two-dimensional, i.e., a matrix shape and vertical shift registers b, b, . . . disposed in accordance with every vertical columns of the light receiving elements so as to transfer the signal charges in the vertical direction. For simplicity, the light receiving elements are not shown and therefore the image unit a is illustrated in FIG. 1 as if it were composed of only the vertical registers b, b, . . .

As shown in FIG. 1, a first horizontal register c is disposed beneath the image unit a and a second horizontal register d is disposed in parallel to the first horizontal register c by a small distance from the first horizontal register c in the under side. A control gate e is disposed between the two horizontal registers c and d so as to control the transfer of signals charges between the first and second horizontal registers c and d. Channel stoppers f are arranged on the semiconductor substrate surface portion at its position corresponding to the underside of the control gate e in the pitch of one pixel and shown by solid rectangle blocks in FIG. 1.

A first output unit g is adapted to derive the signal charges transferred thereto from the first horizontal register c and a second output unit h is adapted to derive signal charges transferred thereto from the second horizontal register d. A first correlation double sampling circuit (CDS circuit) i is adapted to reduce a noise of an output signal from the first output unit g and a second CDS circuit j is adapted to reduce a noise of an output signal from the second output unit h. A first automatic gain control (AGC) amplifier k is adapted to amplify an output signal of the first CDS circuit i and a second AGC amplifier l is adapted to amplify an output signal of the second CDS circuit j. A signal processor circuit m is adapted to derive a luminance signal Y and red and blue color difference signals R-Y and B-Y by sampling respective color signals from the AGC amplifiers k and l.

When the storage of signal charges in the respective light receiving elements is finished, then a signal charge of the first line from the bottom of the image unit a is parallelly transferred to the first horizontal register c and then the signal charge of the first line is transferred to the second horizontal register d by the control gate e. Then, a signal charge of the second line from the bottom of the image unit a is transferred to the first horizontal register c. Thereafter, the signal charges of the first and second lines are simultaneously transferred by the first and second horizontal registers c, d, whereby video signals are simultaneously output to the outside of the solid state imager from the two output units g and h. A series of these operations are repeated at every 1H period.

Japanese Laid-Open Patent Publication No. 62-92587, for example, describes research results of the above solid state imager having two horizontal registers to derive two video signals simultaneously.

Since the solid state image pickup element includes two output units and two circuit systems in the above solid state imager shown in FIG. 1, there is then the problem that a horizontal stripe and a flicker will take place due to a gain difference between the two circuit systems.

Particularly, when the signal is read in the interlace-system, a signal from the same light receiving element (pixel) is transferred by the different horizontal registers c, d at odd and even fields and then output from the different output units g, h. As a consequence, a gain difference between the two circuit systems cannot be neglected. Referring to FIG. 2, let us now describe in detail the above phenomenon such that the signal from the same light receiving element is transferred through the different circuit systems at odd and even fields.

FIG. 2 shows how the signal charges, accumulated in light receiving elements (B0, A0, B1, A1, B2, A2) of one vertical column, are transferred at odd and even fields in a comparing fashion.

As shown in FIG. 2, at the odd field, the light receiving elements B0 and A0, B1 and A1, and B2 and A2 form pairs and the paired signals are simultaneously read by the two horizontal registers c, d. Of the signals of the paired two horizontal lines, signals of the upper light receiving elements A0, A1, A2, . . . are transferred by the first horizontal register c. The flow of the signals transferred by the first horizontal register c is represented by an open arrow in FIG. 2. Of the signals of the paired two horizontal lines, signals of the lower light receiving elements B0, B1, B2, . . . are transferred by the second horizontal register d. The flow of the signals transferred by the second horizontal register d is represented by a solid arrow in FIG. 2. In this case, the open arrow and the solid arrow in FIG. 2 do not mean the difference of signal charge amounts or the like.

At the even field, the light receiving elements A0 and B1, A1 and B2 are paired and the paired signals are simultaneously read by the two horizontal registers c, d. Of the signals of the paired two horizontal lines, the signals of the upper light receiving elements B1, B2, . . . are transferred by the first horizontal register c, while the signals of the lower light receiving elements A0, A1, . . . are transferred by the second horizontal register d.

Accordingly, the signals of the respective light receiving elements are transferred by the different horizontal registers during the odd field or during the even field. More specifically, the signals of the light receiving elements A0, A1, A2, . . . are transferred by the first horizontal register c during the odd field and transferred by the second horizontal register d during the even field. Further, the signals of the light receiving elements B0, B1, B2, . . . are transferred by the second horizontal register d during the odd field and transferred by the first horizontal register c during the even field. As a consequence, the same signal is processed by different circuit systems (channels) during the odd field or during the even field. Accordingly, a gain difference between the two circuit systems causes noises, such as horizontal stripe, flicker and so on to occur.

OBJECTS AND SUMMARY OF THE INVENTION

Accordingly, it is an object of the present invention to provide an improved solid state imager in which the aforementioned shortcomings and disadvantages of the prior art can be eliminated.

More specifically, it is an object of the present invention to provide a solid state imager in which a solid state image pickup element has two output units and which can prevent a horizontal stripe and a flicker from taking place due to a gain difference between two circuit systems (channels) thereof.

Another object of the present invention is to provide a solid state image pickup element in which pilot signals for detecting gains of two circuit systems, which process signals from two output units of a solid state image pickup element, can be inserted into a video signal without modifying a rule with respect to a signal timing.

As a first aspect of the solid state imager of the present invention, a pilot signal generating means is provided within a solid state image pickup element so as to permit two output units to derive pilot signals of the same level and a gain correcting circuit is provided outside of the solid state image pickup element for comparing levels of the pilot signals passed through two circuit systems and correcting gains of the two circuit systems so as to remove a level difference if the two circuit systems have any level difference. If the two circuit systems have any level difference therebetween, then such level difference appears as a level difference of pilot signals of the same level supplied thereto from the pilot signal generating means through the two circuit systems. Thus, the level difference is detected by the gain correcting circuit and the gains of the circuit systems are controlled so as to remove such level difference.

In accordance with a second aspect of the solid state image pickup element of the present invention, the dummy bit output period is provided only in order to adjust the timing so that a signal within that period is neither a video signal nor is processed as a video signal. Accordingly, if the pilot signal is output during that period, then a gain difference between the two circuit systems due to the pilot signals can be detected without modifying the rule with respect to the timing of the output signal of the solid state image pickup element. Therefore, it is possible to perform the control operation for removing such gain difference on the basis of the detected result.

The above and other objects, features, and advantages of the present invention will become apparent from the following detailed description of an illustrative embodiment thereof to be read in conjunction with the accompanying drawings.

BRIEF DESCRIPTION OF THE DRAWINGS

FIGS. 3 and 4 are used to explain the embodiment of a solid state imager according to the present invention, wherein;

FIG. 3 is a schematic diagram showing an embodiment of a charge-coupled device having a pair of horizontal registers according to the present invention;

FIG. 4 is a schematic diagram showing a structure of a pilot signal generating means used in the embodiment of the present invention;

FIGS. 5A to 5C and FIGS. 6A to 6D are respectively timing charts of the respective examples of a timing at which a pilot signal is generated, wherein;

FIGS. 5A to 5C are respectively timing charts of signals to which references will be made in explaining timings at which a pilot signal is generated during one horizontal period; and FIGS. 6A through 6D are respectively timing charts of signals to which references will be made in explaining timings at which the pilot signal is generated during one vertical period.

DETAILED DESCRIPTION OF THE PREFERRED EMBODIMENT

Before describing an embodiment of the solid state imager according to the present invention, a principle of the present invention will be described below.

Figure 1:
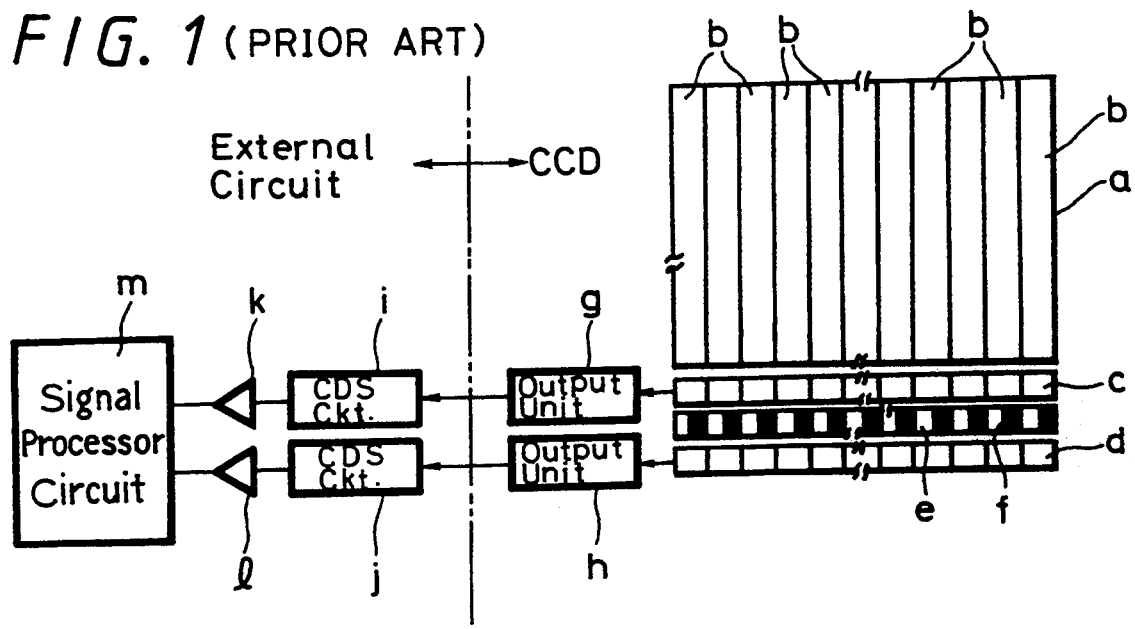
FIG. 1 is a schematic diagram showing an example of a solid state imager according to the prior art.
Figure 2:
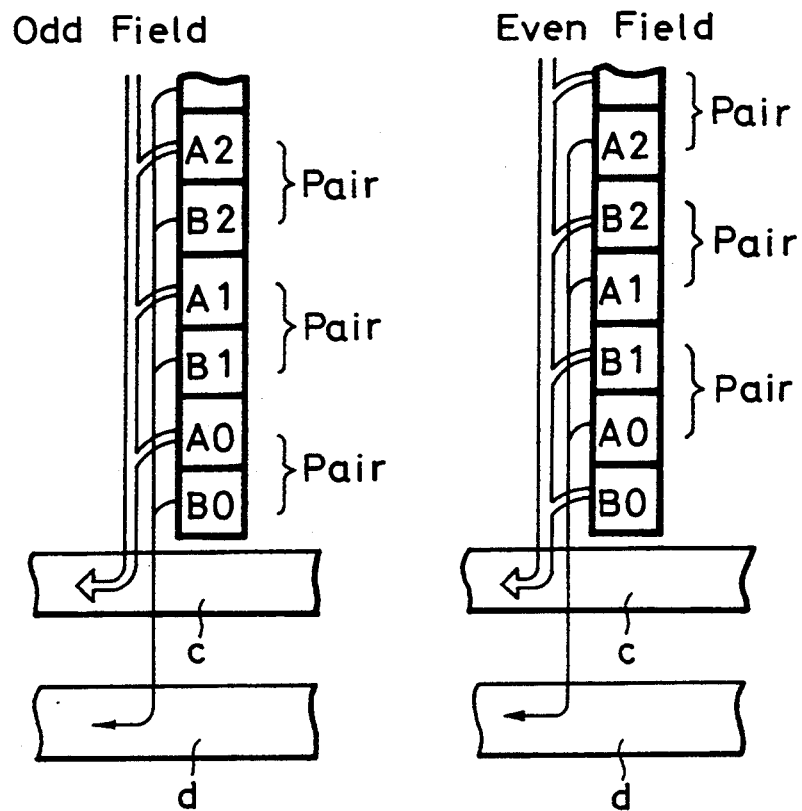
FIG. 2 is a schematic diagram showing the stream of signals, and to which references will be made in explaining the example of the prior-art solid state imager shown in FIG. 1.

In general, the existing rule with respect to the timing of the output signal must be prevented from being varied even by the injection of the pilot signals into the output signals of the solid state image pickup element. Accordingly, having studied a method for inserting the pilot signals into the output signal without varying the above rule with respect to the output signal, the present invention utilizes the fact that a timing can be corrected by dummy bits provided at the transfer side of the horizontal register in the solid state image pickup element, though not shown in FIG. 1.

The embodiment of the charge-coupled device having a pair of horizontal registers according to the present invention will now be described with reference to the drawings.

FIGS. 3 and 4 are respectively schematic diagrams used to explain the embodiment of the charge-coupled device having a pair of horizontal registers according to the present invention. FIG. 3 schematically shows a structure of the solid state imager of the present invention.

Referring to FIG. 3, it will be seen that an image unit 1 is composed of a large number of light receiving elements (several hundreds of thousands of light receiving elements to several millions of light receiving elements)

and vertical registers 2, 2, . . . disposed in accordance with the respective vertical columns of the light receiving elements. For simplicity, the light receiving elements are not shown and the image unit 1 is illustrated in FIG. 3 as if it was composed of only the vertical registers 2, 2, . . .

As shown in FIG. 3, a first horizontal register 3a is disposed beneath the image unit 1 and a second horizontal register 3b is disposed in parallel to the first horizontal register 3a by a small distance from the first horizontal register 3a in its under side. A control gate 4 is disposed between the two horizontal registers 3a and 3b so as to control the transfer of signals charges between the first and second horizontal registers 3a and 3b. Channel stoppers 5, 5, . . . are arranged on the semiconductor substrate surface portion at its position corresponding to the underside of the control gate 4 in the pitch of one pixel and shown by solid rectangle blocks in FIG. 3.

A dummy bit unit 6 is formed by extending the first and second horizontal registers 3a, 3b from the portions corresponding to the image unit 1 to the side to which the signal charge is transferred. The dummy bit unit 6 is provided in order to correct the timing or the like and the bit number thereof falls within a range of from several bit to several tens of bits depending upon the type of the dummy bit unit 6.

A pilot signal insertion unit 7 is formed by extending the horizontal registers 3a, 3b and the control gate 4 from the portions corresponding to the image unit 1 toward the side opposite to the dummy bit unit 6 by the bit number substantially the same as that of the dummy bit unit 6. A pilot signal generating unit 8 is adapted to supply the signal charge, which is served as a pilot signal, to the pilot signal insertion unit 7. This pilot signal generating unit 8 is comprised of an input source region 9, a first input gate 10a and a second input gate 10b as shown in FIG. 4.

While the input source region 9 is illustrated in the form of the unitary bit body whose bit number is the same as that of the pilot signal insertion unit 8 in FIG. 4, the input source region 9 is composed of, in actual practice, independent bits so as to generate signal charges of more than a predetermined amount, to be more concrete, signal charges of more than the level of the necessary pilot signal at a predetermined timing. The input gates 10a and 10b are supplied with transfer pulses and transfer signals, served as the pilot signals within the input source region 9, to the horizontal registers 3a and 3b. At that time, the input gates 10a and 10b are adapted to restrict the amount of the signal charges to the constant amount by the potential difference based on the supplied voltage difference. The timings at which the pilot signal is generated will be described more in detail later.

First and second output units 11a, 11b are adapted to convert the signal charges transferred from the first and second horizontal registers 3a and 3b into voltages and output the same. First and second CDS circuits 12a, 12b are adapted to remove a noise (reset noise) from the signals of the first and second output units 11a, 11b, and amplifiers 13a, 13b whose gain can be controlled are adapted to amplify the output signals of the first and second CDS circuits 12a, 12b. At least one of the two amplifiers 13, 13b, for example, the amplifier 13a must be designed so as to be able to control its gain. The output unit 11a within the solid state imager, the CDS circuit 12a and the amplifier 13a both of which are located outside the solid state imager constitute a first circuit system (first channel), and the output unit 11b within the solid state imager, the CDS circuit 12b and the amplifier 13b both of which are located outside the solid state imager constitute a second circuit system (second channel).

A signal processing circuit 14 samples respective color signals output from the amplifiers 13a, 13b and further processes the sampled color signals to thereby provide the luminance signal Y and the red and blue color difference signals R-Y and B-Y.

A gain correcting circuit 15 is comprised of first and second sample and hold circuits 16a, 16b for sampling pilot signals from the output signals of the first and second amplifiers 13a, 13b and a comparing circuit 17 for comparing the outputs of the first and second sample and hold circuits 16a, 16b. An output signal of the comparing circuit 17 is supplied to one amplifier whose gain can be controlled, for example, the amplifier 13a as a gain control signal. If the level of the pilot signal sampled from the output signal from the first amplifier 13a is lower than that of the pilot signal sampled from the output signal from the second amplifier 13b, then the gain control signal goes, for example, high to increase the gain of the first amplifier 13a. Conversely, if the former level is lower than the latter level, then the gain control signal goes, for example, low to decrease the gain of the first amplifier 13a.

Alternatively, two output signals of opposite phases may be supplied from the comparing circuit 17 to the first and second amplifiers 13a, 13b as the gain control signals. In that case, if the level of the pilot signal sampled from the output signal of the first amplifier 13a is lower than that of the pilot signal sampled from the output signal of the second amplifier 13b, then the gain of the first amplifier 13a is increased, while the gain of the second amplifier 13b is decreased. Conversely, if the former level is higher than the latter level, then the gain of the first amplifier 13a is decreased, while the gain of the second amplifier 13b is increased.

FIGS. 5A, 5B and 5C are respectively timing charts illustrating an example of the way of how the pilot signal is generated.

In this embodiment, the pilot signal is generated at every horizontal period during the horizontal blanking period. As shown in FIGS. 5A through 5C, in synchronism with a horizontal synchronizing signal HD, in other words, during the horizontal blanking period, a signal charge of a constant amount is injected from the input source region 9 to the horizontal registers 3a, 3b as a pilot signal by means of the input gates 10a, 10b. Then, a pilot signal is generated in the output signals of the solid state image pickup element (two output signals are generated but only one output signal is shown for simplicity) with a delay time slightly longer than one horizontal period after the signal charge is inserted into the horizontal registers 3a, 3b. The pilot signal in the output signal from the first output unit 11a and the pilot signal in the output signal from the second output unit 11b are both the same in level because the amounts of the signal charges transferred from the input source region 9 to the horizontal registers 3a, 3b are restricted by the input gates 10a, 10b. The timings at which the pilot signals are generated in the output signals are made coincident with that of the dummy bit (however, with the delay time of one horizontal period after the signal charge is inserted into to the horizontal registers 3a, 3b). Further, the duration of the period in which the pilot signal is generated is selected to be substantially the same as that of the dummy bit period because the change of the rule (change of the timings of the respective signals in the output signal or the like) with respect to the output signal of the solid state image pickup element must be prevented from taking place due to the insertion of the pilot signal into the output signal. Incidentally, the duration of period in which the pilot signal is generated (i.e., pulse width of the pilot signal) may be shorter than the duration of the dummy bit period.

Further, the pilot signal may be generated at every vertical period as shown in FIGS. 6A through 6D, in which reference symbol VD denotes a vertical synchronizing signal.

According to the above-mentioned solid state imager of the present invention, if the two circuit systems (channels), that is, the circuit system composed of the output unit 11a, the CDS 12a and the amplifier 13a and the circuit system composed of the output unit 11b, the CDS 12b and the amplifier 13b have a gain difference therebetween, then such gain difference takes place as a level difference between the pilot signals in the output signals of the amplifiers 13a, 13b. This level difference is detected by the comparing circuit 17 which compares the output signals of the sample and hold circuits 16a, 16b. The detected signal from the comparing circuit 17 is used to control either of or both of the gains of the amplifiers 13a, 13b so as to remove the above level difference. Accordingly, the gains of the amplifiers 13a, 13b are controlled so as to remove the gain difference therebetween, thereby keeping the circuit condition such that no gain difference exists between the two circuit systems constantly.

Therefore, the troubles, such as the horizontal stripe and flicker caused by the gain difference between the two circuit systems can be avoided.

As described above, the present invention is directed to the solid state imager which is comprised of the solid state image pickup element having two output units to simultaneously derive the signals from the two output units and the external circuit having the two circuit systems for processing the signals output from the above output units. In this case, the solid state imager of the present invention is provided with the pilot signal generating means formed within the solid state image pickup element for generating the signals of the same level to the two output units as the pilot signals and the gain correcting circuit for comparing the levels of the pilot signals supplied through the two circuit systems and controlling the gains of the two circuit systems such that the level difference between the two circuits is removed.

Therefore, according to the solid state imager according to the present invention, if the two circuit systems have the gain difference therebetween, then such level difference appears as the level difference between the pilot signals of the same level supplied from the pilot signal generating means through the circuit systems. Thus, the level difference is detected by the gain correcting circuit and the gains of the circuit systems can be controlled by the gain correcting circuit so as to remove the level difference. Accordingly, the gain difference between the two circuit systems can be removed and also the occurrence of the horizontal stripe and flicker due to the above gain difference can be prevented.

Further, in the solid state image pickup element of the present invention, the solid state image pickup element is comprised of the two horizontal registers having the dummy bits provided at the transfer side, in which the two signals are simultaneously output from the two horizontal registers through the output units. In this case, the solid state image pickup element includes the pilot signal generating means for supplying the signal charges of the same amount to the two horizontal registers as the pilot signals, wherein the signal charges are supplied from the pilot signal generating means to the respective horizontal registers so that the pilot signals are output during the dummy bit output period.

Therefore, according to the image pickup element of the present invention, the dummy bit output period is provided only in order to adjust the timing. Thus, the signal during that period is neither the video signal nor processed as the video signal. Accordingly, if the pilot signals are output during that period, then the gain difference between the two horizontal registers can be removed by the pilot signals without modifying the rule with respect to the timing at which the solid state image pickup element derives the output signal.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. A solid state imager in which a solid state image pickup element is provided with two horizontal registers, two output units with one output unit connected to the output of one of the two horizontal registers and the output of the other output unit connected to the output of the other horizontal register, and an external circuit formed of two circuit systems for processing the signals from said two output units, comprising:

pilot signal generating means provided within said solid state image pickup element for generating plurality bit signals having the same amplitude level which are supplied to said two output units as pilot signals;

a gain correcting circuit for comparing the levels of said pilot signals which have passed through said two circuit systems and for controlling the gains of at least one of said two circuit systems so as to remove a level difference between said two circuit systems which is comprised of first and second correlated double sampling circuits, first and second amplifiers, first and second sample and hold circuits and a comparing circuit; and said first correlated double sampling circuit, said first amplifier, and said first sample and hold circuit connected in series between the output of said first horizontal register and said comparing circuit, and said second double sampling circuit, said second amplifier, and said second sample and hold circuit connected in series between the output of said second horizontal register and said comparing circuit and the output of said comparing circuit connected to at least one of said first and second amplifiers to control its gain;

said two horizontal registers each having a transfer side for receiving signals from said solid state image pickup element and said two horizontal registers each having an extended portion, said pilot signal generating means being located adjacent the transfer side of said extended portions of said horizontal registers and supplying the pilot signals at the same amplitude level in the form of a plurality of dummy bits through said transfer sides to each of said horizontal registers.

2. Apparatus according to claim 1, wherein said gain correcting circuit comprises means for outputting said plurality of dummy bits from two horizontal registers during a dummy bit output period.

3. Apparatus according to claim 1, including means for causing said pilot signal generating means to supply said pilot signals to the extended portions of said two horizontal registers during each horizontal blanking interval.

4. Apparatus according to claim 1, wherein said two horizontal registers are extended in both directions relative to said image pickup unit, the extension of said registers at the end opposite from said pilot signal generating means being adapted to manifest said plurality of dummy bits during said dummy bit output period, during each horizontal scanner cycle.

* * * * *